(12) United States Patent
Matsumoto et al.

(10) Patent No.: US 8,351,812 B2
(45) Date of Patent: Jan. 8, 2013

(54) PRINTING CONTROL SYSTEM AND PRINTING SYSTEM

(75) Inventors: Masanori Matsumoto, Osaka (JP); Tsutomu Yoshimoto, Osaka (JP); Tomoko Toizumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 267 days.

(21) Appl. No.: 12/910,120

(22) Filed: Oct. 22, 2010

(65) Prior Publication Data

US 2011/0097099 A1 Apr. 28, 2011

(30) Foreign Application Priority Data

Oct. 23, 2009 (JP) ................................. 2009-244467

(51) Int. Cl.
G03G 15/00 (2006.01)
(52) U.S. Cl. ................................ 399/81; 399/82; 399/85
(58) Field of Classification Search ..................... 399/81, 399/82, 85
See application file for complete search history.

(56) References Cited

U.S. PATENT DOCUMENTS

| 7,856,202 B2 * | 12/2010 | Mizobuchi et al. | ............ 399/389 |
| 7,952,731 B2 * | 5/2011 | Utsunomiya et al. | ......... 358/1.13 |

FOREIGN PATENT DOCUMENTS

| JP | 2001-180085 | 7/2001 |
| JP | 2003-186361 | 7/2003 |
| JP | 2003-248576 | 9/2003 |
| JP | 2003-260857 | 9/2003 |
| JP | 2004-302653 | 10/2004 |
| JP | 2005-062290 | 3/2005 |
| JP | 2005-335325 | 12/2005 |
| JP | 2007-086646 | 4/2007 |

* cited by examiner

*Primary Examiner* — Hoang Ngo
(74) *Attorney, Agent, or Firm* — Edwards Wildman Palmer LLP; David G. Conlin; Steven M. Jensen

(57) ABSTRACT

A printing control system includes: operation means configured to enter a first printing condition including information on the number of page images to be printed on one printing sheet and the total number of page images to be printed; display means; and control means. The control means compare ratios of reduction in the usage of printing sheets provided by the one or more second printing conditions to a preset threshold value, and sets the first printing condition as the final printing condition when the ratios of reduction in the usage of printing sheets provided by the one or more second printing conditions are less than the threshold value while causing the display means to display the one or more second printing conditions when the ratios of reduction in the usage of printing sheets provided by the one or more second printing conditions are not less than the threshold value.

10 Claims, 10 Drawing Sheets

FIG.5A

| NUMBER OF PAGE IMAGES (M) | SINGLE-SIDE 2-Up (2in1) NUMBER OF PRINTING SHEETS(N) | S.-SIDE 2-Up (2in1) RATIO OF REDUCTION IN THE USAGE OF PRINTING SHEETS(S) | S.-SIDE 4-Up (4in1) NUMBER OF PRINTING SHEETS(N) | S.-SIDE 4-Up (4in1) RATIO OF REDUCTION IN THE USAGE OF PRINTING SHEETS(S) | S.-SIDE 8-Up (8in1) NUMBER OF PRINTING SHEETS(N) | S.-SIDE 8-Up (8in1) RATIO OF REDUCTION IN THE USAGE OF PRINTING SHEETS(S) |
|---|---|---|---|---|---|---|
| 1 | 1 | 0% | 1 | 0% | 1 | 0% |
| 2 | 1 | 50% | 1 | 50% | 1 | 50% |
| 3 | 2 | 33% | 1 | 67% | 1 | 67% |
| 4 | 2 | 50% | 1 | 75% | 1 | 75% |
| 5 | 3 | 40% | 2 | 60% | 1 | 80% |
| 6 | 3 | 50% | 2 | 67% | 1 | 83% |
| 7 | 4 | 43% | 2 | 71% | 1 | 86% |
| 8 | 4 | 50% | 2 | 75% | 1 | 88% |
| 9 | 5 | 44% | 3 | 67% | 2 | 78% |
| 10 | 5 | 50% | 3 | 70% | 2 | 80% |
| 11 | 6 | 45% | 3 | 73% | 2 | 82% |
| 12 | 6 | 50% | 3 | 75% | 2 | 83% |
| 13 | 7 | 46% | 4 | 69% | 2 | 85% |
| 14 | 7 | 50% | 4 | 71% | 2 | 86% |
| 15 | 8 | 47% | 4 | 73% | 2 | 87% |
| 16 | 8 | 50% | 4 | 75% | 2 | 88% |
| 17 | 9 | 47% | 5 | 71% | 3 | 82% |
| 18 | 9 | 50% | 5 | 72% | 3 | 83% |
| 19 | 10 | 47% | 5 | 74% | 3 | 84% |
| 20 | 10 | 50% | 5 | 75% | 3 | 85% |
| 21 | 11 | 48% | 6 | 71% | 3 | 86% |
| 22 | 11 | 50% | 6 | 73% | 3 | 86% |
| 23 | 12 | 48% | 6 | 74% | 3 | 87% |
| 24 | 12 | 50% | 6 | 75% | 3 | 88% |
| 25 | 13 | 48% | 7 | 72% | 4 | 84% |
| 26 | 13 | 50% | 7 | 73% | 4 | 85% |
| 27 | 14 | 48% | 7 | 74% | 4 | 85% |
| 28 | 14 | 50% | 7 | 75% | 4 | 86% |
| 29 | 15 | 48% | 8 | 72% | 4 | 86% |
| 30 | 15 | 50% | 8 | 73% | 4 | 87% |
| 31 | 16 | 48% | 8 | 74% | 4 | 87% |
| 32 | 16 | 50% | 8 | 75% | 4 | 88% |

FIG.5B

| NUMBER OF PAGE IMAGES (M) | DOUBLE-SIDE 1-Up (1in1) NUMBER OF PRINTING SHEETS(N) | D.-SIDE 1-Up (1in1) RATIO OF REDUCTION IN THE USAGE OF PRINTING SHEETS(S) | D.-SIDE 2-Up (2in1) NUMBER OF PRINTING SHEETS(N) | D.-SIDE 2-Up (2in1) RATIO OF REDUCTION IN THE USAGE OF PRINTING SHEETS(S) | D.-SIDE 4-Up (4in1) NUMBER OF PRINTING SHEETS(N) | D.-SIDE 4-Up (4in1) RATIO OF REDUCTION IN THE USAGE OF PRINTING SHEETS(S) |
|---|---|---|---|---|---|---|
| 1 | 1 | 0% | 1 | 0% | 1 | 0% |
| 2 | 1 | 50% | 1 | 50% | 1 | 50% |
| 3 | 2 | 33% | 1 | 67% | 1 | 67% |
| 4 | 2 | 50% | 1 | 75% | 1 | 75% |
| 5 | 3 | 40% | 2 | 60% | 1 | 80% |
| 6 | 3 | 50% | 2 | 67% | 1 | 83% |
| 7 | 4 | 43% | 2 | 71% | 1 | 86% |
| 8 | 4 | 50% | 2 | 75% | 1 | 88% |
| 9 | 5 | 44% | 3 | 67% | 2 | 78% |
| 10 | 5 | 50% | 3 | 70% | 2 | 80% |
| 11 | 6 | 45% | 3 | 73% | 2 | 82% |
| 12 | 6 | 50% | 3 | 75% | 2 | 83% |
| 13 | 7 | 46% | 4 | 69% | 2 | 85% |
| 14 | 7 | 50% | 4 | 71% | 2 | 86% |
| 15 | 8 | 47% | 4 | 73% | 2 | 87% |
| 16 | 8 | 50% | 4 | 75% | 2 | 88% |
| 17 | 9 | 47% | 5 | 71% | 3 | 82% |
| 18 | 9 | 50% | 5 | 72% | 3 | 83% |
| 19 | 10 | 47% | 5 | 74% | 3 | 84% |
| 20 | 10 | 50% | 5 | 75% | 3 | 85% |
| 21 | 11 | 48% | 6 | 71% | 3 | 86% |
| 22 | 11 | 50% | 6 | 73% | 3 | 86% |
| 23 | 12 | 48% | 6 | 74% | 3 | 87% |
| 24 | 12 | 50% | 6 | 75% | 3 | 88% |
| 25 | 13 | 48% | 7 | 72% | 4 | 84% |
| 26 | 13 | 50% | 7 | 73% | 4 | 85% |
| 27 | 14 | 48% | 7 | 74% | 4 | 85% |
| 28 | 14 | 50% | 7 | 75% | 4 | 86% |
| 29 | 15 | 48% | 8 | 72% | 4 | 86% |
| 30 | 15 | 50% | 8 | 73% | 4 | 87% |
| 31 | 16 | 48% | 8 | 74% | 4 | 87% |
| 32 | 16 | 50% | 8 | 75% | 4 | 88% |

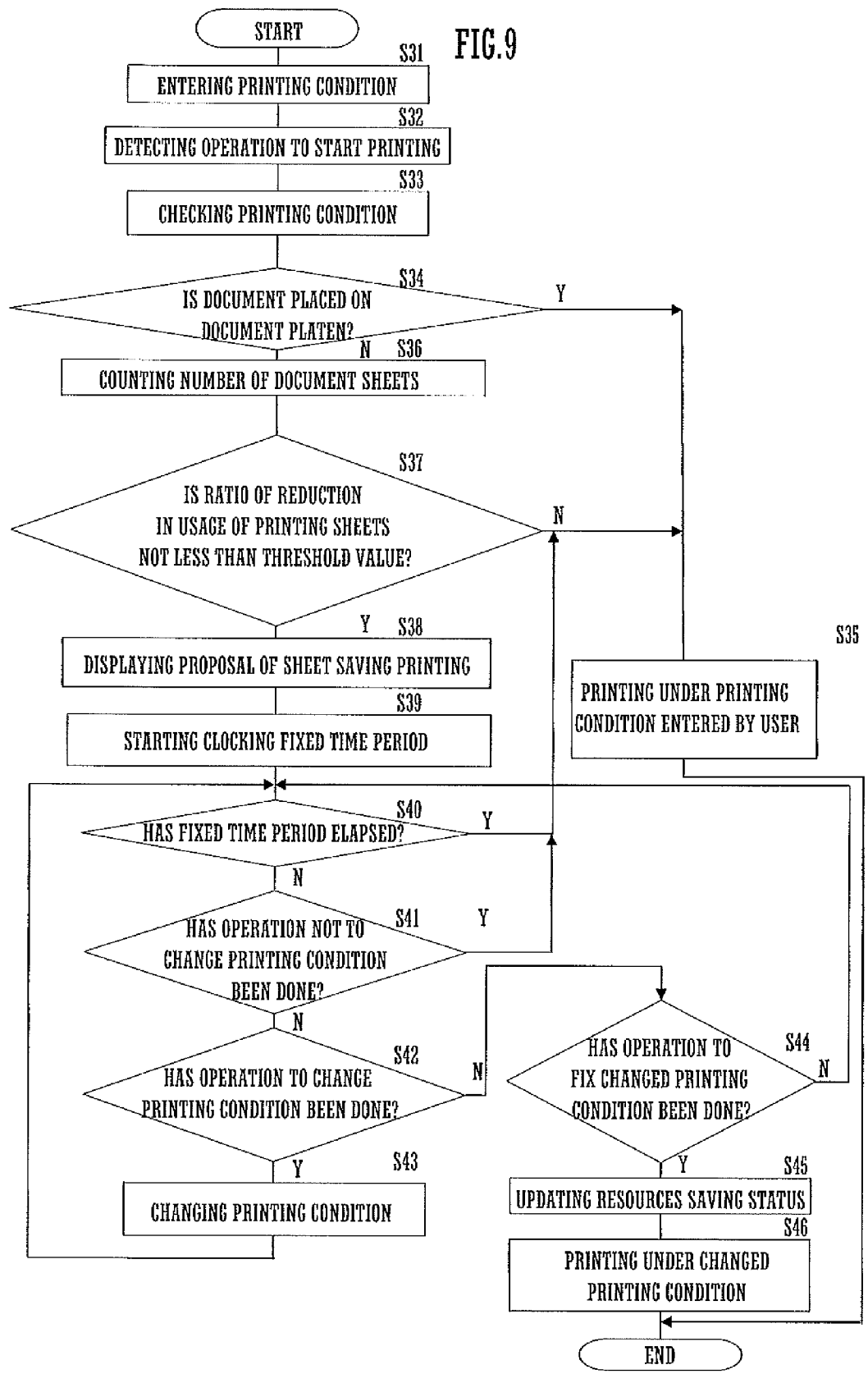

PRINTING CONTROL SYSTEM AND PRINTING SYSTEM

CROSS REFERENCE

This Nonprovisional application claims priority under 35 U.S.C. §119(a) on Patent Application No. 2009-244467 filed in Japan on Oct. 23, 2009, the entire contents of which are hereby incorporated by reference.

BACKGROUND OF THE INVENTION

The present invention relates to a printing control system and a printing system which are capable of reducing the usage of printing sheets.

From the viewpoint of global environmental protection focused in recent years, the printing technology field is increasingly demanded to save resources including printing materials used by image forming apparatuses such as printing sheets and coloring materials. Among the functions of image forming apparatuses, there are functions of the type which can reduce the number of printing sheets to be used for printing, such as a double-side printing function for printing images on both sides of a printing sheet and an aggregate printing function for printing a plurality of images on one printing sheet by scaling the images down, thereby facilitating the resources saving.

For example, a print setting proposing system is disclosed which is configured to present a user interface (UI) which allows the user to select a desired print application from at least two print applications in response to a request for printing from the user, propose a specific printing condition suitable for the print application that has been selected by the user using the UI, prepare printing data attached with the printing condition in response to approval of the user to the proposal, and transfer the printing data thus prepared to a printer (see Japanese Patent Laid-Open Publication No. 2004-302653).

One known image forming apparatus is configured to automatically cancel an aggregate printing function before printing when image data to be printed is one-page image data even though aggregate printing is to be performed (see Japanese Patent Laid-Open Publication No. 2001-180085).

The aforementioned conventional print setting proposing system, however, involves a problem that the user is imparted with a sensation of troublesomeness because presentation of the user interface and the proposal of a printing condition are made every time the user makes a request for printing.

The aforementioned conventional image forming apparatus has a problem of being not so user-friendly because the aggregate printing function is sometimes automatically cancelled against the user's intention even when the user wishes aggregate printing.

Accordingly, a feature of the present invention is to provide a printing control system and a printing system which fail to automatically cancel a printing condition and make a sheet saving proposal to the user when a large resources saving effect can be expected, whereby these systems can be conveniently used by the user without imparting the user with the sensation of troublesomeness.

SUMMARY OF THE INVENTION

A printing control system according to the present invention comprises:

operation means configured to enter a first printing condition including information on the number of page images to be printed on one printing sheet and the total number of page images to be printed;

display means;

control means configured to set a final printing condition based on the first printing condition entered by the operation means; and printing means configured to perform printing under the final printing condition set by the control means, wherein:

the control means changes the first printing condition to one or more second printing conditions that provide higher ratios of reduction in the usage of printing sheets than the first printing condition to compare the ratios of reduction in the usage of printing sheets provided by the one or more second printing conditions to a preset threshold value of ratio of reduction in the usage of printing sheets;

when the ratios of reduction in the usage of printing sheets provided by the one or more second printing conditions are less than the threshold value, the control means sets the first printing condition as the final printing condition;

when the ratios of reduction in the usage of printing sheets provided by the one or more second printing conditions are not less than the threshold value, the control means causes the display means to display the one or more second printing conditions that provide the ratios of reduction in the usage of printing sheets which are not less than the threshold value; and the operation means includes selection means configured to select the final printing condition from the first printing condition and the one or more second printing conditions displayed by the display means.

If the ratios of reduction in the usage of printing sheets provided by the second printing conditions which are changed from the first printing condition entered from the user as printing conditions recommended to the user are less than the threshold value, the control means causes printing to be performed under the first printing condition entered by the user without proposing a change of printing condition. On the other hand, if the ratios of reduction in the usage of printing sheets provided by the second printing conditions are not less than the threshold value, the control means causes the display means to display the second printing conditions and then causes printing to be performed under any one of the first printing condition and the second printing conditions that is selected by the user.

The printing control system may further comprise storage means configured to store therein information on the number of printed page images and information on the number of printed sheets, wherein:

when the display means displays the one or more second printing conditions, the control means updates the information on the number of printed page images and the information on the number of printed sheets which are stored in the storage means on a user-by-user basis every time the printing means performs printing; and the control means reads the information on the number of printed page images and the information on the number of printed sheets out of the storage means on a user-by-user basis at any desired time, calculates a ratio of reduction in the number of printed sheets accomplished within a fixed period based on the information on the number of printed page images and the information on the number of printed sheets thus read, and causes the display means to display the ratio of reduction in the number of printed sheets thus calculated.

When the display means displays the one or more second printing conditions, the control means updates the information on the number of printed page images and the information on the number of printed sheets which are stored in the storage means on a user-by-user basis every time the printing means performs printing.

The foregoing and other features and attendant advantages of the present invention will become more apparent from the reading of the following detailed description of the invention in conjunction with the accompanying drawings.

BRIEF DESCRIPTION OF THE DRAWINGS

FIGS. 5A and 5B are tables registered with plural sheet saving printing conditions;

FIG. 9 is a flowchart of an exemplary process carried out by a printer.

DETAILED DESCRIPTION OF THE INVENTION

Figure 1:
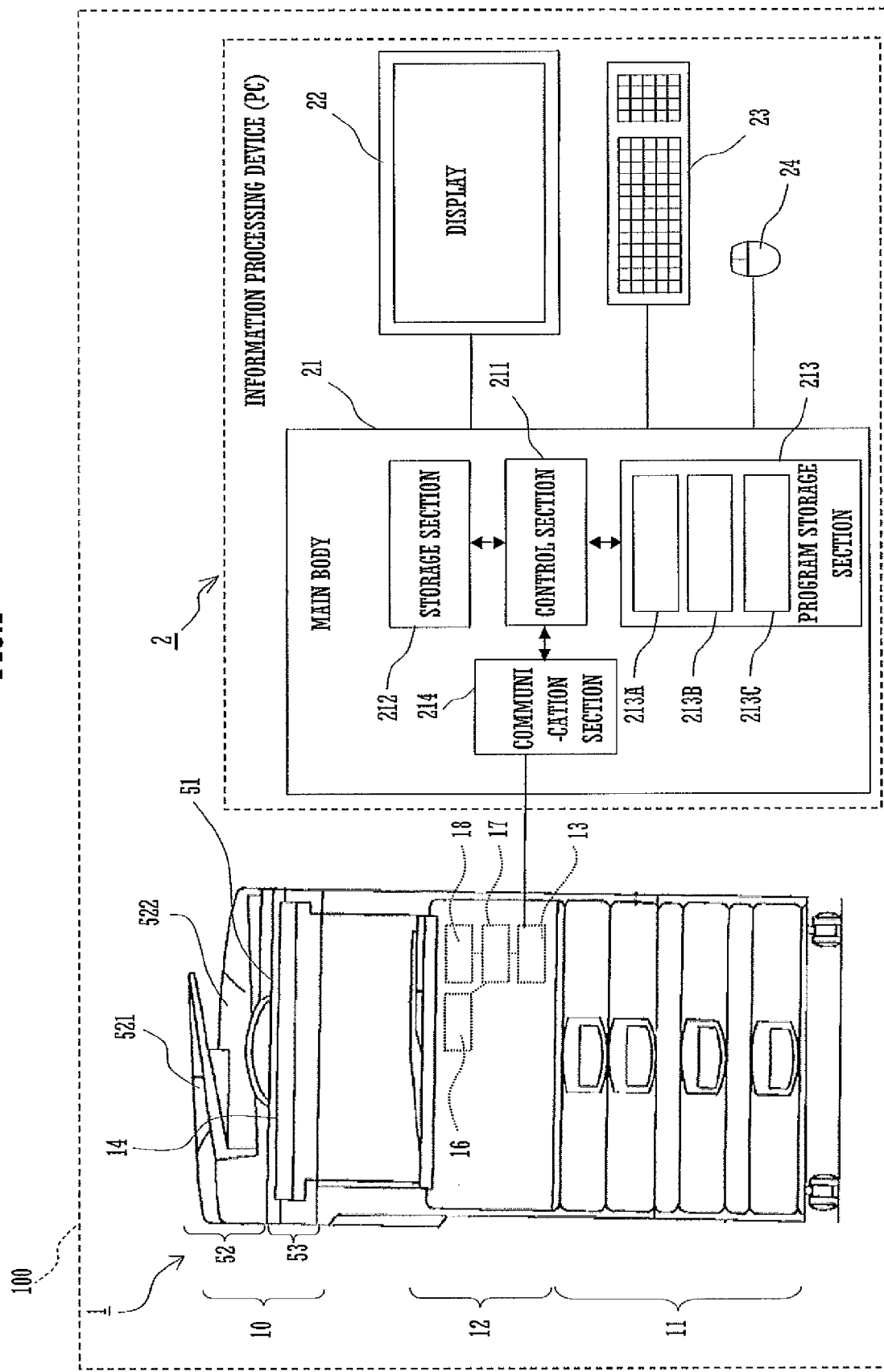
FIG. 1 is a block diagram illustrating a printing system to which a printing control system according to an embodiment of the present invention is applied.

Referring to FIG. 1, there is shown a printing system 100 according to an embodiment of the present invention which comprises a printer 1 and an information processing device 2 connected thereto.

The printer 1 includes an image reading section 10, a sheet feeding section 11, an image forming section 12, a communication section 13, an operating section 14, a display section 15, a program storage section 16, a control section 17, and a storage section 18. For instance, the printer 1 is a multifunctional apparatus configured to perform electrophotographic printing and has the functions of a printer and a copier.

The image reading section 10 includes a document platen 51, an automatic document feeder (hereinafter will be referred to as "ADF") 52 disposed over the document platen 51, and a scanner unit 53 disposed below the document platen 51.

The image reading section 10 detects whether or not a document is placed on the document platen 51 by means of a non-illustrated sensor. The image reading section 10 generates image data by reading image information from the document fed onto or placed on the document platen 51 by means of the scanner unit 53 and then outputs the image data to the image forming section 12.

The ADF 52 serves also as a document cover and is mounted over the document platen 51 by means of a non-illustrated hinge to cover the document platen 51 openably. The ADF 52 detects whether or not a document is placed on a document tray 521 by means of a non-illustrated sensor. The ADF 52 feeds document sheets placed on the document tray 521 onto the document platen 51 one by one and delivers the document sheets from which the scanner unit 53 has read image information onto a document delivery tray 522.

An input mode in which a document is fed by the ADF 52 onto the document platen 51 for reading of image information from the document by the scanner unit 53 to input a page image, will hereinafter be referred to as "ADF mode".

Another input mode in which a document is placed on the document platen 51 for reading of image information from the document by the scanner unit 53 to input a page image, will hereinafter be referred to as "OC mode".

When the control section 17 detects that the operating section 14 has received a copying start operation, the control section 17 causes the sheet feeding section 11 to feed a printing sheet to the image forming section 12 and then causes the image forming section 12 to carry out a printing process based on image data read from a document by the image reading section 10 to form an image on the printing sheet. When the image data transmitted from the information processing device 2 is received by the communication section 13 and then outputted to the image forming section 12, the printer 1 feeds a printing sheet from the sheet feeding section 11 to the image forming section 12 and then carries out a printing process by the image forming section 12 based on the image data transmitted from the information processing device 2 to form an image on the printing sheet.

The printer 1 can form images on different types of printing sheets including not only a paper sheet but also a recording medium formed from a material other than paper such as OHP film. The type of printing process to be carried out by the printer 1 may be selected from a plurality of types irrespective of which type of printing, electrophotographic printing, ink jet printing or other type of printing.

The information processing device 2, which is a personal computer (PC) for example, includes a main body 21, a display 22, a keyboard 23, and a mouse 24. The main body 21 includes a control section 211, a storage section 212, a program storage section 213, and a communication section 214.

The control section 211 performs various controls including a control over operations of different sections of the main body 21, a display control over the display 22 connected to the main body 21, and an entry control associated with entry operations of the user on the keyboard 23 and the mouse 24.

The program storage section 213 is installed therein with an application program 213A for data preparation, a printer driver 213B for controlling the operation of the printer 1 during printing, and a printing control program 213C of the present invention, together with an operating system.

The control section 211 executes the programs stored in the program storage section 213. The control section 211 prepares image data including document data in accordance with entry operations performed by the user on the keyboard 23 and the mouse 24 during the execution of the application program 213A for data preparation stored in the program storage section 213. The control section 211 converts the image data thus prepared to display data and then displays the display data on the display 22 while storing it in the storage section 212.

The control section 211 prepares printing data from the image data stored in the storage section 212 in accordance with data on operations on the keyboard 23 and the mouse 24 during the execution of the printer driver 213B stored in the program storage section 213. The printing data thus prepared is outputted to the printer 1 connected to the communication section 214 either via a network or directly.

Figure 2:
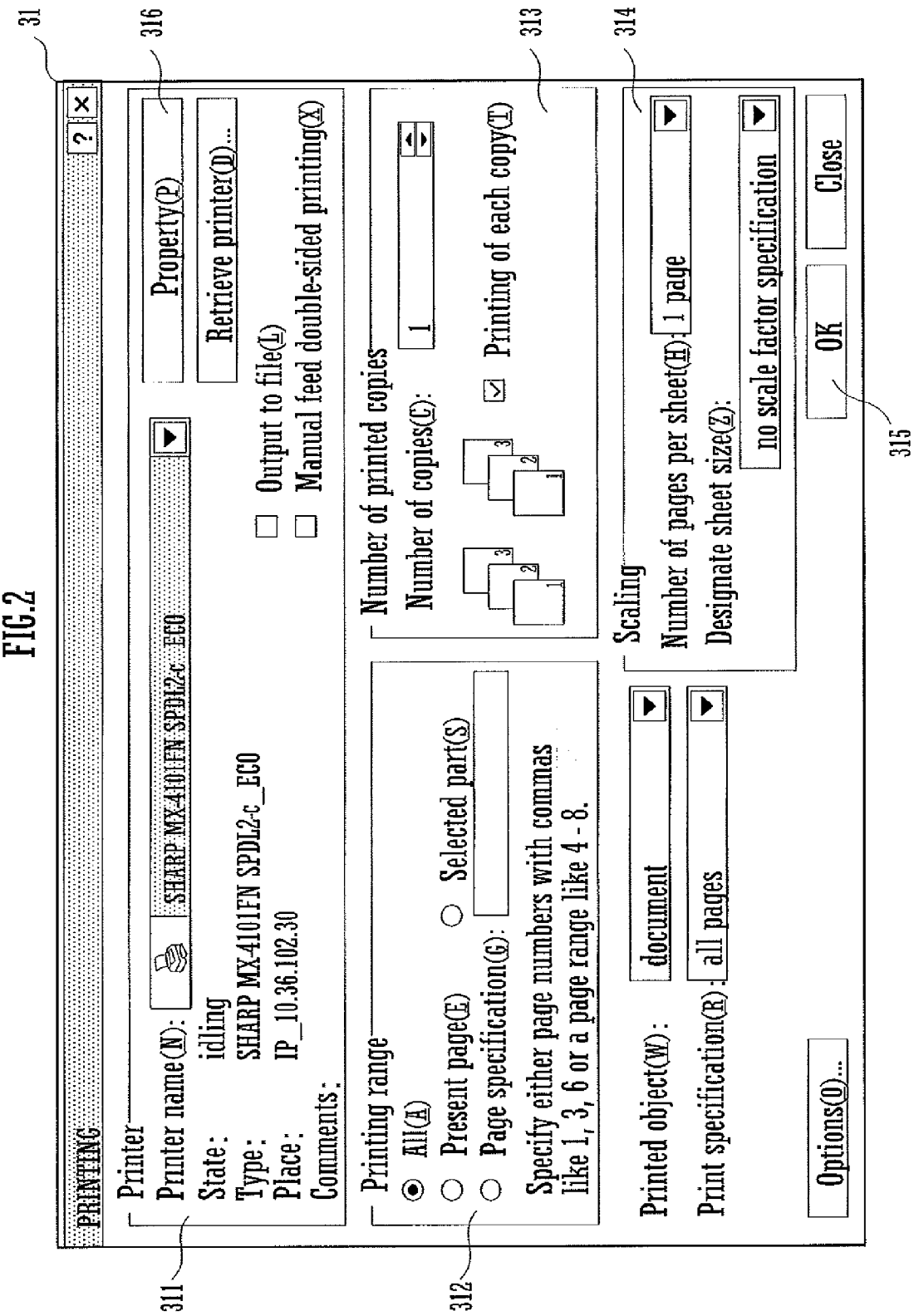
FIG. 2 is a view illustrating an exemplary printing window displayed by a printer driver.

When the user makes a request for printing by operating the keyboard 23 or the mouse 24 during the execution of the application program 213A, the control section 211 executes the printer driver 213B to cause the display 22 to open a printing window 31 illustrated as an example in FIG. 2.

As shown in FIG. 2, the printing window 31 is provided therein with a printer setting zone 311, a printing range zone 312, a "number of printed copies" zone 313, a scaling zone 314, and the like, together with a printing start button 315.

The printing range zone 312 receives entry of specification of a printing range in the image data prepared by the application program. The "number of printed copies" zone 313 receives entry of a specified number of printed copies of image data in the printing range set by way of the printing range zone 312. The scaling zone 314 shows particulars of settings entered or calculation results with respect to the number of page images per sheet and the size of a printing sheet, which form a printing condition needed to determine a scale factor for an image to be formed on a printing sheet. The printer setting zone 311 shows the name of printer 1 to be used for printing and receives entry of a change of the printer to be used for printing when a plurality of printers are present that can be handled by the information processing device 2. The printer setting zone 311 is provided with a property button 316 for checking the printing condition. When the user operates the property button 316 by using the mouse 24, the display 22 opens a print settings window 32 shown as an example in FIG. 3.

Figure 3:
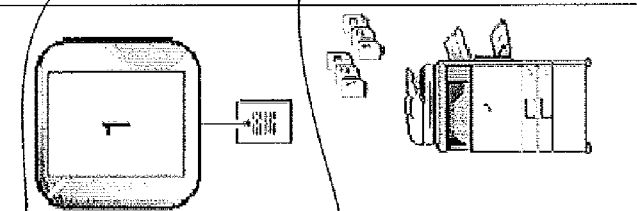
FIG. 3 is a view illustrating an exemplary print settings window displayed by the printer driver.

As shown in FIG. 3, the print settings window 32 is provided with a plurality of tabs 321A to 321G for opening respective windows each providing information on use or nonuse of a respective one of available functions of the printer 1 and each capable of receiving entry of a change of printing condition. For example, the main tab 321A opens a window having zones 322 to 327, each of which receives entry of a change of printing condition for a respective one of the functions including specification of the number of copies, double-side printing, aggregate printing, finishing, printing direction and monochromatic printing.

In the print settings window 32 there are provided an OK button 328 and a cancel button 329. The OK button 328 receives an operation to fix a changed printing condition. The cancel button 329 receives an operation to cancel a changed printing condition. The OK button 328 and the cancel button 329 are setting completion buttons which are operated when confirmation of a printing condition and a change of printing condition have been completed.

Figure 4:
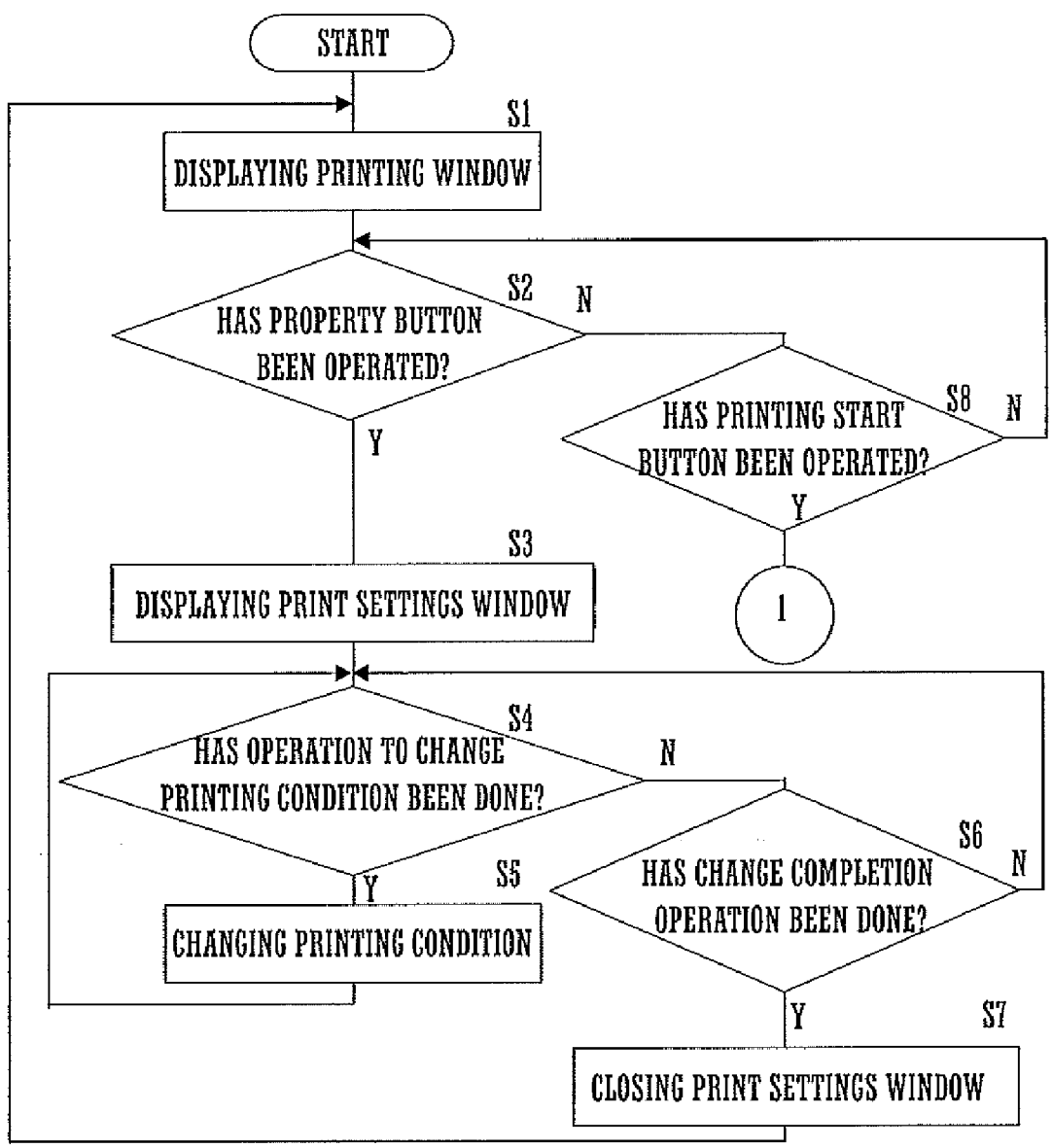
FIG. 4 is a flowchart of an exemplary process carried out by a control section driven by the printer driver.

As shown in FIG. 4, when the information processing device 2 receives a request for printing during the execution of the application program 213A, the control section 211 executes the printer driver 213B to display the printing window 31 shown in FIG. 2 at the frontmost position on the display 22 (step S1) and waits for the user to enter a printing condition and the like. When a request for confirmation of a printing condition is made by the user operating the property button 316 in the printing window 31 (step S2), the control section 211 displays the print settings window 32 shown in FIG. 3 at the frontmost position on the display 22 (step S3) and waits for entry of a change of printing condition.

When the entry of a change of printing condition is made by way of the print settings window 32 (step S4), the control section 211 changes the printing condition for each function stored in the storage section 212 (step S5). When one of the setting completion buttons, i.e., the OK button 328 and the cancel button 329, in the print settings window 32 is operated (step S6), the print settings window 32 on the display 22 is is closed and the process returns to step S1 (step S7). Thus, the printing widow 31 is again displayed at the frontmost position on the display 22. At that time, a printing condition is set which includes the number of page images to be printed per sheet and the total number of page images to be printed. At this stage, the printing condition entered by the user is fixed. The printing condition thus fixed is herein referred to as "first printing condition".

Upon detection of a user's operation on the printing start button 315 by using the mouse 24 to give an instruction to start printing (i.e., in response to an instruction to start printing) with the printing window 31 being displayed on the display 22, the control section 211 executes the printing control program 213C stored in the program storage section 213.

When the printing control program 213C is started up, the control section 211 determines a sheet saving effect which will result from change from the printing condition entered by the user (i.e., first printing condition) to a sheet saving printing condition. If it is determined that a higher effect will be obtained, the control section 211 selects one or more recommended printing conditions from one or more sheet saving printing conditions that can reduce the usage of printing sheets more than the first printing condition and displays the printing conditions thus selected on the display 22. The one or more recommended printing conditions are one or more second printing conditions. That printing condition which is selected by the user from the one or more second printing conditions displayed on the display 22 is set as a final printing condition.

The printing conditions which can reduce the usage of printing sheets more than the first printing condition (i.e., sheet saving printing conditions) include aggregate printing, double-side printing, and double-side aggregate printing.

The aggregate printing, which is also called "M-up printing" or "M in 1 printing", is a condition for collectively printing, on one side of a printing sheet, (M) number of images each corresponding to one page to be originally printed on one side of one printing sheet (hereinafter will be referred to as "page image(s)"). For example, 2-up printing scales the size of a page image down to 50% to print the page image on a printing sheet; 4-up printing scales the size of a page image down to 25% to print the page image on a printing sheet; and 8-up printing scales the size of a page image down to 12.5% to print the page image on a printing sheet.

The double-side printing is a condition for printing one page image on each of the both sides of a printing sheet without scaling it down.

The double-side aggregate printing is a condition for collectively printing (M) number of page images on each of the both sides of a printing sheet.

FIGS. 5A and 5B show a table registered with plural sheet saving printing conditions each including the number of page images to be printed on one side or both sides of one printing sheet, the number of page images to be printed (i.e., the number of page images of a document) and the ratio of reduction in the usage of printing sheets determined from these numbers. In FIGS. 5A and 5B, "single-side 2-up", "double-side 4-up" and the like are expressions each representing the number of page images to be printed on one side or both sides of one printing sheet.

The ratio of reduction in the usage of printing sheets (s) indicates how much usage of printing sheets can be reduced by aggregate printing of page images under a sheet saving printing condition as compared with non-aggregate printing of the page images. The ratio of reduction in the usage of printing sheets (S) is represented by the following formula:

$$S(\%) = \{(M-N)/M\} \times 100 = (1 - N/M) \times 100$$

where M represents the number of page images and N represents the number of printing sheets used for printing.

For example, when 4-up printing (single-side) is selected for seven page images, the number of printing sheets used for printing is as small as two and, hence, five (=7−2) printing sheets can be reduced. Therefore, the ratio of reduction in the usage of printing sheets (S) is about 71% (=(1−2/7)×100).

In the information processing device 2, the storage section 212 has previously stored therein the table registered with plural sheet saving printing conditions as shown in FIGS. 5A and 5B. The information processing device 2 is configured such that the control section 211 references the table stored in the storage section 212 when necessary.

In the example shown in FIGS. 5A and 5B, when the number of page images is one, any one of the sheet saving printing conditions cannot reduce the usage of printing sheets but merely reduces the size of a printed image and, hence, the ratio of reduction in the usage of printing sheets is 0%. When the number of page images is three, selection of single-side 2-up printing or double-side printing (1-up printing) will result in a ratio of reduction as low as 33% in the usage of printing sheets and, hence, the sheet saving effect obtained by aggregate printing is not very large.

Though the ratio of reduction in the usage of printing sheets differs according to the number of page images and the type of sheet saving printing, the ratio of reduction in the usage of printing sheets increases as the number of page images increases. For example, the ratio of reduction in the usage of printing sheets obtained by 2-up printing (single-side) is 50% at maximum and that obtained by 8-up printing (double-side) is 94% at maximum. Therefore, such sheet saving printing conditions exhibit large sheet saving effects.

The information processing device 2 determines the sheet saving effect that will result from printing under a second printing condition changed from the first printing condition set by the user, based on the ratio of reduction in the usage of printing sheets. When the ratio of reduction in the usage of printing sheets that will result from a change to sheet saving printing is less than a predetermined threshold value, the information processing device 2 does not display any proposal of sheet saving printing and performs printing under the first printing condition as established by the user. On the other hand, when the ratio of reduction in the usage of printing sheets that will result from a change to a second printing condition is not less than the predetermined threshold value, the information processing device 2 displays a proposal of the second printing condition. By so doing, the printing system becomes user-friendly and can motivate the user to do highly effective sheet saving.

In the information processing device 2, the storage section 212 has previously stored therein the preset threshold value of the ratio of reduction in the usage of printing sheets which is read by the control section 211 when necessary. The user can vary the threshold value of the reduction in the usage of printing sheets to any desired value at any desired time. With the threshold value set to 40% for example, any proposal of sheet saving printing is not displayed when the sheet saving effect by the sheet saving printing is small, namely, when the number of page images is one or three. Therefore, the user can be prevented from being imparted with a sensation of troublesomeness.

As can be seen from FIGS. 5A and 5B, the ratio of reduction in the usage of printing sheets differs according to sheet saving printing methods even when the number of page images remains the same. For this reason, it is possible to previously establish either a setting for determining the ratios of reduction in the usage of printing sheets obtained by all the available sheet saving printing methods or a setting for determining the ratio of reduction obtained by a specified sheet saving printing method. For example, according to the setting for determining the ratios of reduction in the usage of printing sheets obtained by all the available sheet saving printing methods, if the threshold value for determining the ratios of reduction in the usage of printing sheets is set to 40% as described above, the information processing device 2 determines the ratios of reduction obtained by all the available sheet saving printing methods when the number of page images is two or four, but fails to determine the ratios of reduction obtained by all the available sheet saving printing methods when the number of page images is one. When the number of page images is three, the information processing device 2 determines the ratios of reduction obtained by the sheet saving printing methods exclusive of 2-up printing (single-side) and 1-up printing (double-side). According to the setting for determining the ratio of reduction obtained by 2-up printing (single-side) as a specified sheet saving printing method, the information processing device 2 determines only the ratio of reduction obtained by 2-up printing (single-side) of all the page images.

In determining whether or not to display a proposal of sheet saving printing, use may be made of the reduction in the number of printed sheets instead of the ratio of reduction in the usage of printing sheets. For example, when the threshold value of reduction in the number of printed sheets is set to two, determination is made as follows. In the cases where: the number of page images is one and the number of printing sheets to be used is one (i.e., the reduction in the number of printed sheets is zero); the number of page images is two and the number of printing sheets to be used is one (i.e., the reduction in the number of printed sheets is one); and the number of page images is three and the number of printing sheets to be used is two (i.e., the reduction in the number of printed sheets is one), printing is performed as instructed by the user without displaying a proposal of sheet saving printing. In other cases (where the reduction in the number of printed sheets is two or more), on the other hand, proposed sheet saving printing methods are displayed for the user to select one of them and printing is performed according to the method selected by the user.

The second printing conditions (i.e., recommended printing conditions) are proposed in such a manner that plural printing methods are displayed for selection. It is desirable that proposed printing conditions be displayed together with the ratios of reduction in the usage of printing sheets obtained by the respective printing conditions for the user to select a printing condition having a higher sheet saving effect.

It is also possible to establish a setting for changing the type of second printing condition to be proposed in accordance with the number of page images. For example, when the number of page images is two, proposal is made of 2-up printing (single-side) and 1-up printing (double-side). When the number of page images is three, proposal is made of 4-up printing (single-side) and 2-up printing (double-side), but proposal is not made of 2-up printing (single-side) and 1-up printing (double-side) of which the ratios of reduction in the usage of printing sheets are less than 40%. When the number of page images is four, proposal is made of 2-up printing (single-side), 4-up printing (single-side), 1-up printing (double-side) and 2-up printing (double-side).

In selecting an appropriate one of the second printing conditions displayed (i.e., recommended printing conditions), a non-illustrated setting window is opened and then a button associated with the appropriate printing condition is operated by means of the mouse.

Figure 6:
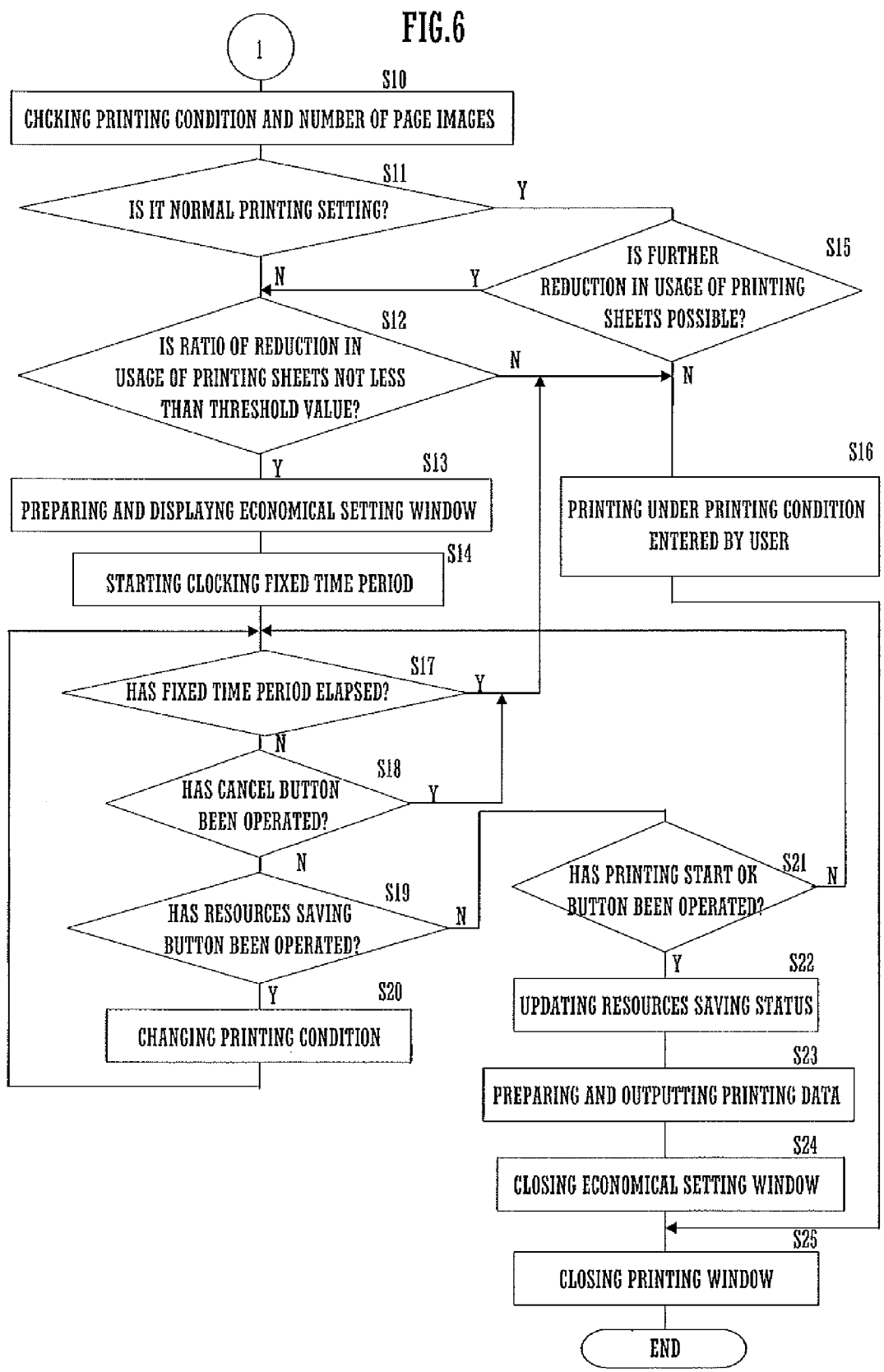
FIG. 6 is a flowchart of an exemplary process carried out by the control section according to a printing control program.

As shown in FIG. 4, the control section 211 starts carrying out the process illustrated in FIG. 6 when the printing control program 213C is started up in step S8. Initially, the control section 211 checks the first printing condition (including the number of page images to be printed on one side or both sides of a printing sheet) entered by the user and the total number of page images to be printed (step S10). When the first printing condition is not a sheet saving printing condition but a normal printing condition for printing a page image on one side of a printing sheet without scaling (step S11), the control section 211 determines the ratio of reduction in the usage of printing sheets obtained as a result of change from the normal printing condition to a sheet saving printing condition (i.e., recommended printing condition). Specifically, based on the information on the number of page images to be printed, the control section 211 compares the threshold value of ratio of reduction in the usage of printing sheets to the ratio of reduction in the usage of printing sheets that is obtained as a result of change from the first printing condition to a second printing condition (step S12). In this step, the control section 211 references the table shown in FIGS. 5A and 5B.

When one or more sheet saving printing conditions each providing a higher ratio of reduction in the usage of printing sheets than the threshold value are present, the one or more sheet saving printing conditions are used as one or more second printing conditions (i.e., recommended printing conditions). In this case, it is possible to select only those sheet saving printing conditions which provide higher ratios of reduction in the usage of printing sheets than the preset threshold value, as well as to exclude specified printing conditions. An economical setting window 33 (see FIG. 7) is prepared for displaying the one or more second printing conditions (i.e., recommended printing conditions) thus selected and is displayed at the frontmost position on the display 22 (step S13).

In comparing the threshold value to the ratio of reduction in the usage of printing sheets which is obtained when the first printing condition is changed to the second printing condition in step S12, it is possible to compare the threshold value to the ratios of reduction in the usage of printing sheets obtained by plural sheet saving printing conditions (i.e., recommended printing conditions). In this case, a setting is established such that only when one or more recommended printing conditions each providing a ratio of reduction equal to or higher than the threshold value are present, the user is informed of such recommended printing conditions in step S13.

The control section 211 displays plural proposals of sheet saving printing in the economical setting window 33 when there are plural sheet saving printing conditions each providing a higher ratio of reduction in the usage of printing sheets than the threshold value. Then, the control section 211 starts clocking a preset fixed time period (for example 20 seconds) (step S14).

When a sheet saving printing condition has been set as the is first printing condition in step S11, the control section 211 determines whether or not a proposal can be made of another sheet saving printing condition that offers a further reduction in the usage of printing sheets than the first printing condition (step S15). For example, when the first printing condition is set as a condition under which four page images are printed by 2-up printing (single-side), two printing sheets are required for printing. When the first printing condition is changed to 4-up printing (single-side) or 2-up printing (double-side), only one printing sheet is required for printing. In this case, a further reduction in the usage of printing sheets can be proposed. On the other hand, when the first printing condition is set as a condition under which four page images are printed by 4-up printing (single-side), one printing sheet is required for printing. Even when the printing method is changed to any other printing method, one or more printing sheets are required for printing. Therefore, in this case a proposal of a further reduction in the usage of printing sheets cannot be made, though the sheet saving printing condition is set as the first printing condition.

If a proposal can be made of a further reduction in the usage of printing sheets in step S15, the control section 211 performs the operation of step S15.

Figure 7:
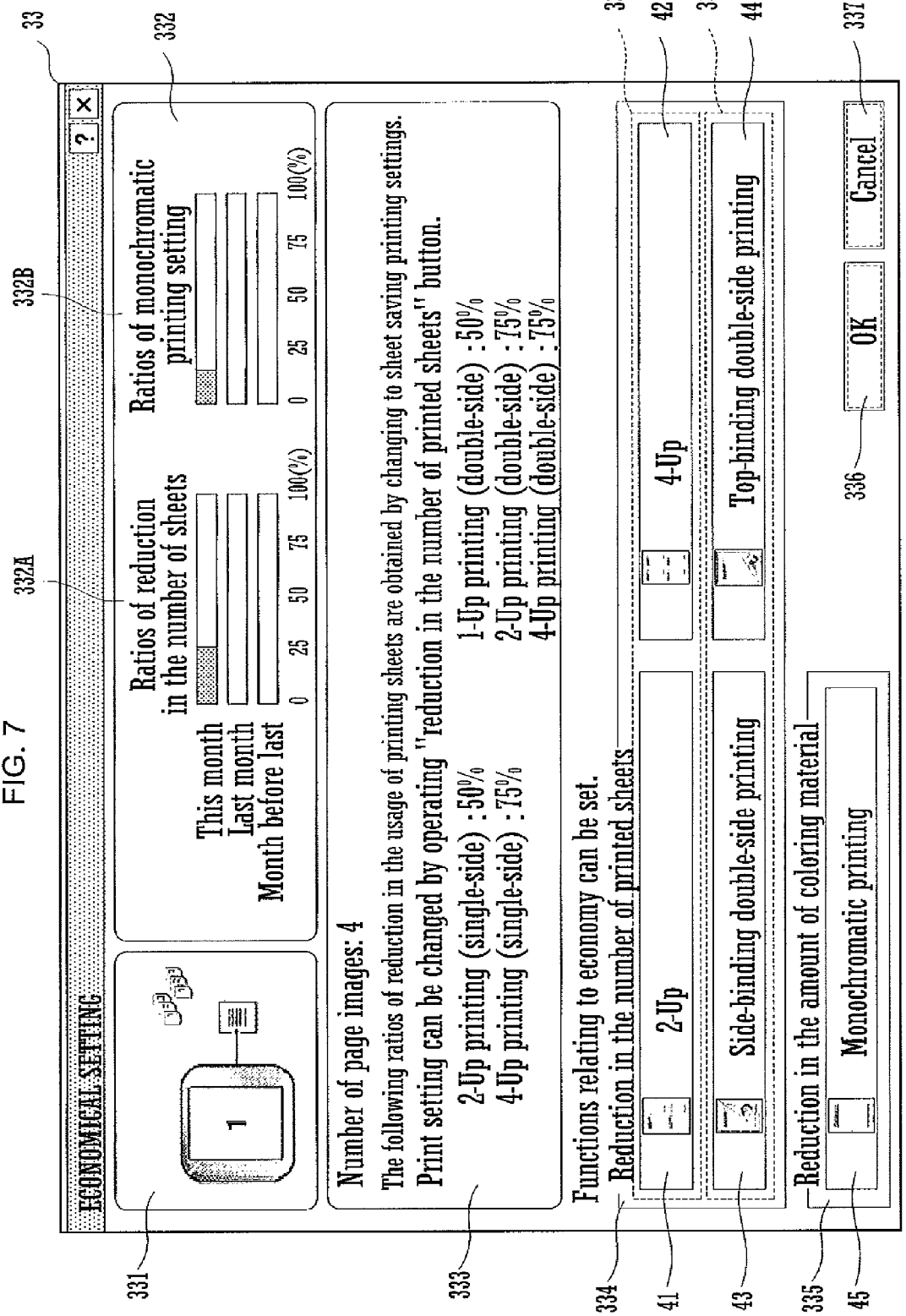
FIG. 7 is a view illustrating an exemplary display of a function setting status of an economical setting window displayed by the printing control program.

If no proposal can be made of a further reduction in the usage of printing sheets in step S15 or if the ratio of reduction in the usage of printing sheets is less than the threshold value in step S12, the control section 211 converts the page image data in the storage section 212 to printing data and then outputs the printing data to the printer 1 without preparing the economical setting window 33 shown in FIG. 7, thereby causing the printer 1 to perform printing under the first printing condition as entered by the user (step S16 which is equivalent to the second printing step). For example, when the setting established by the user is for normal printing of only one page image, the control section 211 converts the page image data in the storage section 212 to printing data such that the page image is printed on one side of a printing sheet without scaling, and then outputs the printing data to the printer 1.

The control section 211 has stored in the storage section 212 information (on the resources saving status) including the total number of printed page images in this month and the number of printed sheets in this month. When no sheet saving proposal is made in step S12 because the ratio of reduction in the usage of printing sheets is less than the threshold value, the control section 211 does not update the information on the resources saving status stored in the storage section 212. The control section 211 does not update the information on the resources saving status when no sheet saving proposal is made because the ratio of reduction in the usage of printing sheets that will result from a change to another printing condition is less than the threshold value. This is because uniform management which includes aggregate calculation of all the results obtained from printing is disadvantageous to users who frequently do printing without being informed of any recommended printing condition because the ratio of reduction in the usage of printing sheets that will result from a change of printing condition is less than the threshold value. Such a management cannot be said as a fair management of the ratios of reduction in the usage of printing sheets.

Thereafter, the control section 211 closes the printing window 31 (step S25) to terminate the process. When the printer 1 receives the printing data from the information processing device 2, the printer 1 performs printing on a printing sheet.

As shown in FIG. 7, the economical setting window 33 has a printed state display zone 331, a resources saving status display zone 332, a "ratios of reduction in the usage of printing sheets" display zone 333, a "reduction in the number of printed sheets" zone 334, a "reduction in the amount of coloring material" zone 335, a printing start OK button 336, and a cancel button (printing condition not-changing button) 337.

The printed state display zone 331 graphically illustrates a printed state that will result when printing is performed under the first printing condition entered by the user which corresponds to one of those functions that can be performed by the printer 1 and can contribute to the resources saving.

The "ratios of reduction in the usage of printing sheets" display zone 333 displays second printing conditions (i.e., recommended printing conditions) together with the ratios of reduction in the usage of printing sheets obtained by the respective second printing conditions when the first printing condition entered by the user is changed to the second printing conditions. The "ratios of reduction in the usage of printing sheets" display zone 333 also displays information for urging the user to select any one of the second printing conditions (i.e., recommended printing conditions).

The "reduction in the number of printed sheets" zone 334 is a zone for setting conditions related to functions that can contribute to the resources saving by reducing the number of printing sheets to be used for printing based on the second printing conditions displayed in the "ratios of reduction in the usage of printing sheets" display zone 333. The "reduction in the number of printed sheets" zone 334 includes an aggregate printing setting zone 334A and a double-side printing setting zone 334B. Conditions set by way of these zones are each a final printing condition.

The aggregate printing setting zone 334A receives entry of a setting of the aggregate printing function for printing plural page images on one side of a printing sheet by scaling the page images down. The aggregate printing setting zone 334A has a 2-up button 41 and a 4-up button 42 for example.

The double-side printing setting zone 334B receives entry of a setting of the double-side printing function for printing different page images on both sides of an unused printing sheet and has a side-binding double-side printing button 43 and a top-binding double-side printing button 44 for example.

The "reduction in the amount of coloring material" zone 335 receives entry of a setting related to a function that can contribute to the resources saving by reducing the amount of a coloring material, such as toner or ink, to be used in a printing process carried out by the printer 1 and has a monochromatic printing button 45. The monochromatic printing button 45 changes color printing to monochromatic printing. The monochromatic printing function is a printing function which can reduce the amount of color toner or color ink to be used by converting color page image data to monochromatic printing data to be printed as a monochromatic page image.

The 2-up button 41, 4-up button 42, side-binding double-side printing button 43, top-binding double-side printing button 44 and monochromatic printing button 45 in the economical setting window 33 are resources saving buttons which allow selection from the functions that can contribute to the resources saving.

When selecting the double-side aggregate printing, the user operates two buttons, i.e., the 2-up button 41 or 4-up button 42 and the side-binding double-side printing button 43 or top-binding double-side printing button 44.

The printing start OK button 336 is operated when the user gives a definitive instruction to start printing by the printer 1. In response to the operation on the printing start OK button 336, page image data is converted to printing data by a changed function setting and is outputted to the printer 1.

The cancel button 337 is operated to give an instruction to print under the first printing condition as entered by the user without changing the printing condition to any one of the second printing conditions. In response to the operation on the cancel button 337, the control section 211 converts page image data to printing data according to the first printing condition and outputs the printing data to the printer 1. As will be described later, the control section 211 closes the economical setting window 33 after lapse of the fixed time period to perform a control for causing printing to be performed under the first printing condition entered by the user. For this reason, it is possible to eliminate the cancel button 337.

The resources saving status display zone 332 displays the status of resources saving in printing processes having been performed by the printer 1. The resources saving status display zone 332 includes a "ratios of reduction in the number of sheets" display zone 332A and a "ratios of monochromatic printing setting" display zone 332B.

The "ratios of reduction in the number of sheets" display zone 332A shows statuses related to reduction in the number of printing sheets at intervals of a fixed period, for example, the ratios of reduction in the number of sheets obtained during three months on a monthly basis. The ratio of reduction in the number of sheets is a ratio of reduction in the number of printing sheets accomplished during the fixed period which is a value obtained by subtracting from 1 the quotient obtained by dividing the number of printing sheets used for printing by the number of page images and expressing the resulting value as a percentage.

The "ratios of monochromatic printing setting" display zone 332B shows statuses related to reduction in the amount of coloring material used, for example, the ratios of monochromatic printing setting established during three months on a monthly basis. The ratio of monochromatic printing setting is the ratio of monochromatic printing processes performed to all the printing processes which the information processing device 2 has instructed the printer 1 to carry out.

Since the monochromatic printing departs from the concept of the present invention, description thereof will be omitted.

As shown in FIG. 6, the control section 211 checks whether or not the fixed time period has elapsed from the start of clocking the fixed time period in step S14 and checks whether or not an operation on button has been done (i.e., whether or not entry has been made of an instruction to permit or cancel printing under any one of the second printing conditions) (steps S17 to S21). In response to receipt of the instruction entered by the operation on the cancel button 337 within the fixed time period to cancel printing under any one of the second printing conditions (step S18), the control section 211 causes the printer 1 to perform printing under the first printing condition without updating the resources saving status stored in the storage section 212 (step S16 which is equivalent to the second printing step).

When any one of the resources saving buttons 41 to 44 in the economical setting window 33 is operated within the fixed time period (step S19), the control section 211 changes the printing condition so as to use the function corresponding to the button operated (step S20).

In response to receipt of an instruction entered by operation on the printing start OK button 336 in the economical setting window 33 within the fixed time period to permit printing under a recommended printing condition (step S21), the control section 211 updates the resources saving status stored in the storage section 212 (step S22), converts page image data stored in the storage section 212 to printing data and then outputs the printing data to the printer 1 (step S23). Thereafter, the control section 211 closes the economical setting window 33 and the printing window 31 (steps S24 and S25) to terminate the process.

If it is determined that the fixed time period has elapsed before any one of the buttons in the economical setting window 33 is operated (step S17), the control section 211 causes the printer 1 to perform printing under the first printing condition entered by the user without updating the resources saving status stored in the storage section 212 and without changing the print setting (step S16).

The control section 211 references the contents stored in the storage section 212 in preparing the printing data in step S23.

Figure 8:
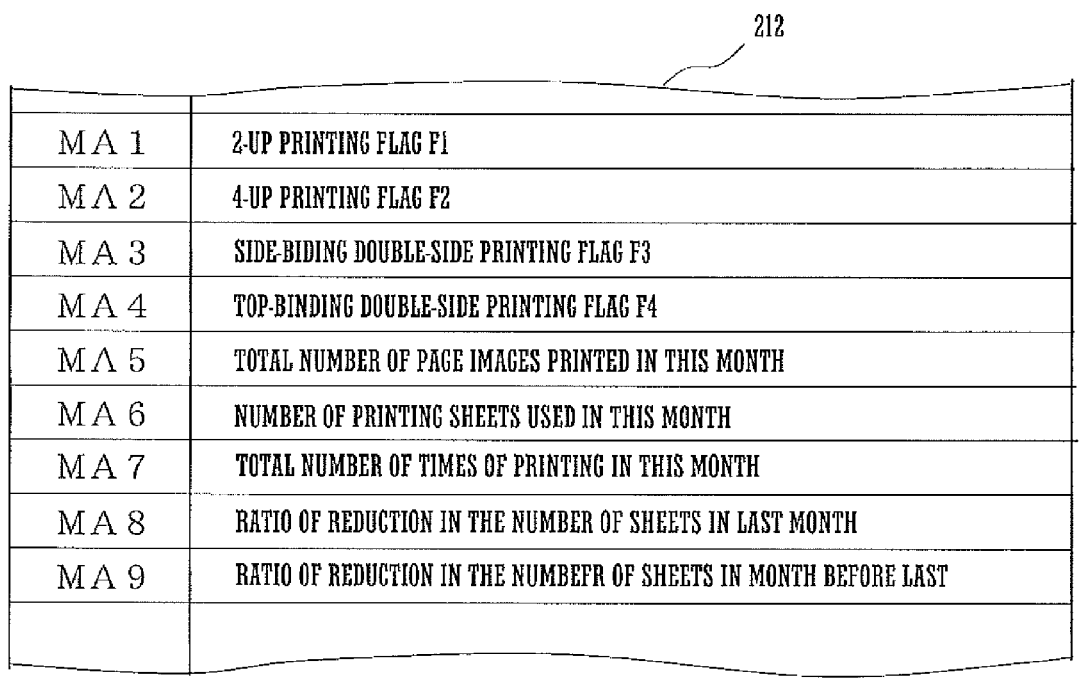
FIG. 8 is a memory map of a relevant portion of a storage section.

As shown in FIG. 8, the storage section 212 has memory areas MA1 to MA4 which are assigned flags F1 to F4, respectively. The flag F1 indicates the status of the 2-up printing function being selected or not. The flag F2 indicates the status of the 4-up printing function being selected or not. The flag F3 indicates the status of the side-binding double-side printing function being selected or not. The flag F4 indicates the status of the top-binding double-side printing function being selected or not.

Though not shown in FIG. 8, the control section 211 performs management of data stored in the memory areas MA1 to MA9 of the storage section 212 on a user-by-user basis. When shared by plural users, the information processing device 2 is configured to be used by a user selected on a start screen. The control section 211 performs management of the ratios of reduction in the number of sheets and other information on a user-by-user basis in accordance with selections on the start screen. Alternatively, it is possible to perform management of identifications of individual users by allowing a user making request for printing to enter his or her user ID at the time of printing condition setting.

The control section 211 sets or resets the flags F1 to F4 according to the settings that have been established by way of the zones 323 and 324 at the time of operation on the OK button 328 in the print settings window 32 in step S6. For example, when the user operates the OK button 328 in step S6 after having selected the 2-up printing function by way of the zone 324 in step S4, the control section 211 sets the flag F1 of the memory area MA1.

When any one of the resources saving buttons 41 to 44 in the economical setting window 33 is operated in step S19, the control section 211 sets the associated one of the flags F1 to F4. For example, when the user operates the 2-up printing button in step S19, the control section 211 sets the flag F1 of the memory area MA1.

The memory areas MA5 to MA9 of the storage section 212 are memory areas for storing therein the total number of page images printed in this month (i.e., information on the number of page images printed in this month), the number of printing sheets used for printing in this month (i.e., information on the number of printing sheets printed in this month), the total number of times of printing performed in this month, the ratio of reduction in the number of sheets accomplished in last month, and the ratio of reduction in the number of sheets accomplished in month before last, respectively.

When performing sheet saving printing, the control section 211 updates the data in the memory areas MA5 and MA6 in step S22. At that time, the control section 211 adds the number of page images to be printed this time to the total number of page images printed in this month which is stored in the memory area MA5 while adding the number of printing sheets to be used for printing to the number of printing sheets printed in this month which is stored in the memory area MA6, thus performing aggregate calculation of data obtained during one month (i.e., during the fixed period).

When performing sheet saving printing, the control section 211 adds (updates) an increase to the total number of page images printed in this month and an increase to the number of printing sheets printed in this month. Therefore, printing under any one of the second printing conditions results in a suppressed increase in the number of printed sheets (i.e., the number of printing sheets printed in this month) and in a rise in the ratio of reduction in the number of sheets used by the user who has done printing.

On the other hand, even in the case of printing under the first printing condition without proposal of any second printing condition, when any sheet saving proposal is not made because the ratio of reduction in the usage of printing sheets is less than the threshold value, the aggregate calculation of the ratio of reduction in the number of sheets does not reflect this printing and, hence, the ratio of reduction in the number of sheets does not vary.

The control section 211 updates the data stored in the memory areas MA5 to MA9 on the first day of each month by referencing information stored in a date storage area provided in the storage section 212.

In step S23, the control section 211 adds the number of page images to be printed this time to the total number of page images printed in this month which is stored in the memory area MA5 while adding the number of printing sheets to be used for printing to the number of printing sheets printed in this month which is stored in the memory area MA6. The control section 211 updates the data stored in the memory areas MA5 to MA9 on the first day of each month by referencing information stored in the date storage area provided in the storage section 212.

In step 13, the control section 211 calculates the ratio of reduction in the number of sheets accomplished in this month based on the data stored in the memory areas MA6 and MA7 and displays the ratio thus calculated in the "ratios of reduction in the number of sheets" zone 332A.

In preparing the printing data in step S23, the control section 211 references the statuses of the flags F1 to F4 of the memory areas MA1 to MA4. In the case where the flag F1 is set, the control section 211 prepares printing data for printing two page images on one side of a printing sheet. In the case where the flag F2 is set, the control section 211 prepares printing data for printing four page images on one side of a printing sheet.

In the case where the flag F3 is set, the control section 211 prepares printing data for printing each page image in a state of being offset to the right for example. In the case where the flag F4 is set, the control section 211 prepares printing data for printing each page image in a state of being offset to the bottom for example.

In the case where the flag F1 or F2 and the flag F3 or F4 are set, the control section 211 prepares printing data for printing two or four page images on each of the both sides of a printing sheet.

In the case where the flag F3 or F4 is set, the control section 211 outputs the printing data together with a command to perform double-side printing to the printer 1.

Description will be made of a copying process carried out by the printer 1 alone.

Like the information processing device 2, the printer 1 has programs previously stored in the program storage section 16 for proposing sheet saving printing methods (i.e., the second printing conditions) in accordance with the ratios of reduction in the usage of printing sheets even in performing copying by the printer 1 alone. The control section 17 is configured to read and execute the programs.

The control section 17 determines whether or not to propose the second printing conditions according to where the page image is placed for being read. That is, the OC mode is often used in cases where the number of page images is one and where the document is of book type, and in like cases. The ADF mode, on the other hand, is often used in cases where plural page images are to be printed because no time and labor is necessary to change page images manually. For this reason, according to the present invention, when in the OC mode which is often used to print one page image, the printer 1 performs printing under the first printing condition as instructed by the user without proposing the second printing conditions. When in the ADF mode which is likely used to print plural page images, the printer 1 proposes the second printing conditions. By proposing the second printing conditions only when the second printing conditions are considered to be effective while avoiding proposal of the second printing conditions when the second printing conditions are not considered to be effective, reduction in the usage of printing sheets can be made in a user-friendly manner.

The printer 1 includes the storage section 18 having stored therein a table as shown in FIGS. 5A and 5B and the control section 18 configured to reference the table when necessary. In the printer 1, the control section 17 may be configured to calculate the ratio of reduction in the usage of printing sheets based on information on the number of page images and the number of printing sheets to be used for printing. In the printer 1, the storage section 18 has previously stored therein the preset threshold value of the ratio of reduction in the usage of printing sheets which is read by the control section 17 when necessary. The user can vary the threshold value of the reduction in the usage of printing sheets to any desired value at any desired time.

FIG. 9 is a flowchart illustrating a copying process carried out by the printer.

When the control section 17 receives entry of a printing condition from the user at the operating section 14 (step S31) and detects receipt of an operation to start printing (step S32), the control section 17 checks the printing condition set by the user (step S33).

The control section 17 checks the page image input mode. Specifically, the control section 17 checks whether on the ADF 52 or on the document platen 51 the document is placed by means of a sensor (step S34). When the document is placed on the document platen 51, the control section 17 determines that the current input mode is the OC mode and allows the scanner unit 53 to read the page image of the document placed on the document platen 51 without proposing the second printing conditions (i.e., recommended printing conditions) and without updating the resources saving status stored in the storage section 18. Thereafter, printing is performed under the first printing condition set by the user (step S35). The control section 17 terminates the process after the printing has been completed.

On the other hand, when the document is placed on the document tray 521 of the ADF 52 in step S34, the control section 17 determines that the current input mode is the ADF mode and then causes the ADF 52 to feed document sheets one by one onto the document platen 51 to allow the scanner unit 53 to read the page images while counting the number of pages images (step S36).

When the counting of the number of page images is completed, the control section 17 compares the preset threshold value to the ratio of reduction in the usage of printing sheets which will be obtained as a result of change from the first printing condition entered by the user to each of the second printing conditions, based on the information on the number of page images to be printed (step S37).

When the ratio of reduction in the usage of printing sheets is less than the threshold value, the control section 17 causes printing to be performed under the first printing condition entered by the user without updating the resources saving status stored in the storage section 18 (step S35). The control section 17 terminates the process after the printing has been completed.

When there are printing conditions that provide ratios of reduction in the usage of printing sheets which are not less than the threshold value, on the other hand, the control section 17 causes the display section 15 to display those printing conditions as the second printing conditions for the user. Also, the control section 17 calculates the ratio of reduction in the number of sheets used in this month based on the resources saving status stored in the storage section 18 and displays the result of the calculation on the display section (step S38).

Subsequently, the control section 17 starts clocking a preset fixed time period (for example one minute) (step S39).

The control section 17 checks whether or not the fixed time period has elapsed and whether or not an operation on the operating section 14 has been done (steps S40 to S44). When an operation for instruction not to change the printing condition is received within the fixed time period (step S41), the control section 17 causes printing to be performed under the first printing condition regarded as the final printing condition without updating the resources saving status stored in the storage section 18 (step S35).

In response to selection of a printing condition from one or more second printing conditions (i.e., recommended printing conditions) (step S42), the control section 17 uses the second printing condition thus selected as the final printing condition (step S43).

When an operation to fix the printing condition selected from the one or more second printing conditions (i.e., recommended printing conditions) is received within the fixed time period (step S44), the control section 17 updates the resources saving status stored in the storage section 18 (step S45) and causes printing to be performed under the selected second printing condition regarded as the final printing condition (step S46). The control section 17 terminates the process after the printing has been completed.

If it is determined that the fixed time period has elapsed before any one of the buttons in the economical setting window 33 is operated (step S40), the control section 17 causes printing to be performed under the first printing condition entered by the user without updating the resources saving status stored in the storage section 18 and without changing the printing condition (step S35).

The control section 17 immediately starts printing under the printing condition changed by the user if the printing condition is a face-down printing condition. If the printing condition is a face-up printing condition, on the other hand, the control section 17 starts printing after reading of page images has been completed.

As described above, the present invention allows printing to be performed under to the first printing condition as entered by the user without proposing the second printing conditions (i.e., recommended printing conditions) when a sheet saving effect cannot be expected by any sheet saving printing condition, for example, when the number of page images is one. By so doing, useless proposal can be avoided. Also, it is possible to improve ease of use for the user. Further, when there are printing conditions each having a higher sheet saving effect than the printing condition entered by the user, those printing conditions are proposed as the second printing conditions (i.e., recommended printing condition) and, hence, the user can save printing sheets easily.

While the foregoing description has been directed to the exemplary arrangement in which the second printing conditions (i.e., recommended printing conditions) are proposed by being displayed on the display 22 of the information processing device 2 or on the display section 15 of the printer 1, the present invention is not limited to such an arrangement. Such a proposal may be informed by voice. In this case, the information processing device 2 or the printer 1 is provided with informing means such as a speaker. It is also possible to inform the user of the proposal by voice and display both.

The foregoing embodiments are illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. A printing control system comprising:
   operation means configured to enter a first printing condition including information on the number of page images to be printed on one printing sheet and the total number of page images to be printed;
   display means;
   control means configured to set a final printing condition based on the first printing condition entered by the operation means; and
   printing means configured to perform printing under the final printing condition set by the control means, wherein:
   the control means changes the first printing condition to one or more second printing conditions that provide higher ratios of reduction n the usage of printing sheets than the first printing condition to compare the ratios of reduction in the usage of printing sheets provided by the one or more second printing conditions to a preset threshold value of ratio of reduction in the usage of printing sheets;
   when the ratios of reduction in the usage of printing sheets provided by the one or more second printing conditions are less than the threshold value, the control means sets the first printing condition as the final printing condition;
   when the ratios of reduction in the usage of printing sheets provided by the one or more second printing conditions are not less than the threshold value, the control means causes the display means to display the one or more second printing conditions that provide the ratios of reduction in the usage of printing sheets which are not less than the threshold value; and
   the operation means includes selection means configured to select the final printing condition from the first printing condition and the one or more second printing conditions displayed by the display means.

2. The printing control system according to claim 1, further comprising storage means configured to store therein information on the number of printed page images and information on the number of printed sheets, wherein:
   when the display means displays the one or more second printing conditions, the control means updates the information on the number of printed page images and the information on the number of printed sheets which are stored in the storage means on a user-by-user basis every time the printing means performs printing; and
   the control means reads the information on the number of printed page images and the information on the number of printed sheets out of the storage means on a user-by-user basis at any desired time, calculates a ratio of reduction in the number of printed sheets accomplished within a fixed period based on the information on the number of printed page images and the information on the number of printed sheets thus read, and causes the display means to display the ratio of reduction in the number of printed sheets thus calculated.

3. The printing control system according to claim 2, wherein:
   the storage means has stored therein a table registered with plural sheet saving printing conditions each including the number of page images to be printed on one printing sheet, the total number of page images to be printed and a ratio of reduction in the usage of printing sheets determined from these numbers, and a threshold value of the ratio of reduction in the usage of printing sheets; and
   the control means compares the ratios of reduction in the usage of printing sheets provided by the second printing conditions which are read out of the table stored in the storage means to the threshold value of the ratio of reduction in the usage of printing sheets read out of the storage means.

4. The printing control system according to claim 1, further comprising clocking means configured to clock a fixed time period when the display means displays the one or more second printing conditions, wherein
   when the selection means fails to select the final printing condition even after completion of the clocking of the fixed time period by the clocking means, the control means sets the first printing condition as the final printing condition.

5. The printing control system according to claim 1, wherein the operation means enters the threshold value of the ratio of reduction in the usage of printing sheets.

6. A printing system comprising:
   a printer configured to print image data on a printing sheet; and
   an information processing device including communication means connected to the printer and configured to transmit the image data to the printer,
   the information processing device including:
   operation means configured to enter a first printing condition including information on the number of page images to be printed on one printing sheet and the total number of page images to be printed;
   display means; and
   control means configured to set a final printing condition based on the first printing condition and to cause the communication means to transmit the image data under the final printing condition, wherein:
   the control means changes the first printing condition to one or more second printing conditions that provide higher ratios of reduction in the usage of printing sheets than the first printing condition to compare the ratios of reduction in the usage of printing sheets provided by the one or more second printing conditions to a preset threshold value of ratio of reduction in the usage of printing sheets;
   when the ratios of reduction in the usage of printing sheets provided by the one or more second printing conditions are less than the threshold value, the control means sets the first printing condition as the final printing condition;
   when the ratios of reduction in the usage of printing sheets provided by the one or more second printing conditions are not less than the threshold value, the control means causes the display means to display the one or more second printing conditions that provide the ratios of reduction in the usage of printing sheets which are not less than the threshold value; and
   the operation means includes selection means configured to select the final printing condition from the first printing condition and the one or more second printing conditions displayed by the display means.

7. The printing system according to claim 6, further comprising storage means configured to store therein information on the number of printed page images and information on the number of printed sheets, wherein:
   when the display means displays the one or more second printing conditions, the control means updates the information on the number of printed page images and the information on the number of printed sheets which are stored in the storage means on a user-by-user basis every time the printer performs printing; and the control means reads the information on the number of printed page images and the information on the number of printed sheets out of the storage means on a user-by-user basis at any desired time, calculates a ratio of reduction in the number of printed sheets accomplished within a fixed period based on the information on the number of printed page images and the information on the number of printed sheets thus read, and causes the display means to display the ratio of reduction in the number of printed sheets thus calculated.

8. The printing system according to claim 7, wherein:
the storage means has stored therein a table registered with plural sheet saving printing conditions each including the number of page images to be printed on one printing sheet, the total number of page images to be printed and a ratio of reduction in the usage of printing sheets determined from these numbers, and a threshold value of the ratio of reduction in the usage of printing sheets; and
the control means compares the ratios of reduction in the usage of printing sheets provided by the second printing conditions which are read out of the table stored in the storage means to the threshold value of the ratio of reduction in the usage of printing sheets read out of the storage means.

9. The printing system according to claim 6, further comprising clocking means configured to clock a fixed time period when the display means displays the one or more second printing conditions, wherein
when the selection means fails to select the final printing condition even after completion of the clocking of the fixed time period by the clocking means, the control means sets the first printing condition as the final printing condition.

10. The printing system according to claim 6, wherein the operation means enters the threshold value of the ratio of reduction in the usage of printing sheets.

* * * * *